United States Patent
Kurz et al.

(10) Patent No.: US 6,226,593 B1
(45) Date of Patent: May 1, 2001

(54) METHOD AND APPLIANCE FOR BRAKING A MOTOR VEHICLE IN THE IMMEDIATE VICINITY OF AN OBSTACLE

(75) Inventors: Gerhard Kurz, Wendlingen; Armin Muller, Gechingen; Thomas Rohrig-Gericke, Ditzingen; Reinhold Schob, Gaufelden; Harry Troster, Tamm, all of (DE)

(73) Assignee: DaimlerChrysler AG (DE)

( * ) Notice: Subject to any disclaimer, the term of this patent is extended or adjusted under 35 U.S.C. 154(b) by 0 days.

(21) Appl. No.: 09/465,625

(22) Filed: Dec. 17, 1999

(30) Foreign Application Priority Data

Jul. 7, 1999 (DE) ............................................. 199 00 314

(51) Int. Cl.$^7$ ..................................................... B60T 7/12
(52) U.S. Cl. ........................... 701/301; 701/96; 340/436; 340/903
(58) Field of Search ................................... 701/301, 302, 701/96, 93; 340/903, 435, 436

(56) References Cited

U.S. PATENT DOCUMENTS 5,432,509 * 7/1995 Kajiwara ............................... 340/903
5,850,176 * 12/1998 Kinoshita et al. .................... 340/435
6,150,932 * 11/2000 Kenue .................................. 340/435

FOREIGN PATENT DOCUMENTS

| 10354A1 | 10/1993 | (DE) . |
| 4339066 | 5/1995 | (DE) . |
| 19647430 | 5/1998 | (DE) . |

* cited by examiner

Primary Examiner—Tan Nguyen
(74) Attorney, Agent, or Firm—Mark P. Calcaterra

(57) ABSTRACT

In a method for braking a motor vehicle at low speeds in order to avoid a collision with an obstacle in its immediate vicinity, the distance and the relative speed between the vehicle and the obstacle are determined by sensor and are based on the calculation of a necessary braking pressure or a deceleration. The brake pressure is generated at least partially independently of the driver. In order to minimize the reaction time in the case of slow approach to an obstacle in the case where the relative speed falls below a threshold value and the distance falls below a proximity limit, the braking torque is set to a smaller value than the engine torque. In the case where the distance falls below a stop limit, which is smaller than the proximity limit, the braking torque and the engine torque are adjusted in such a way that the braking torque exceeds the engine torque.

10 Claims, 1 Drawing Sheet

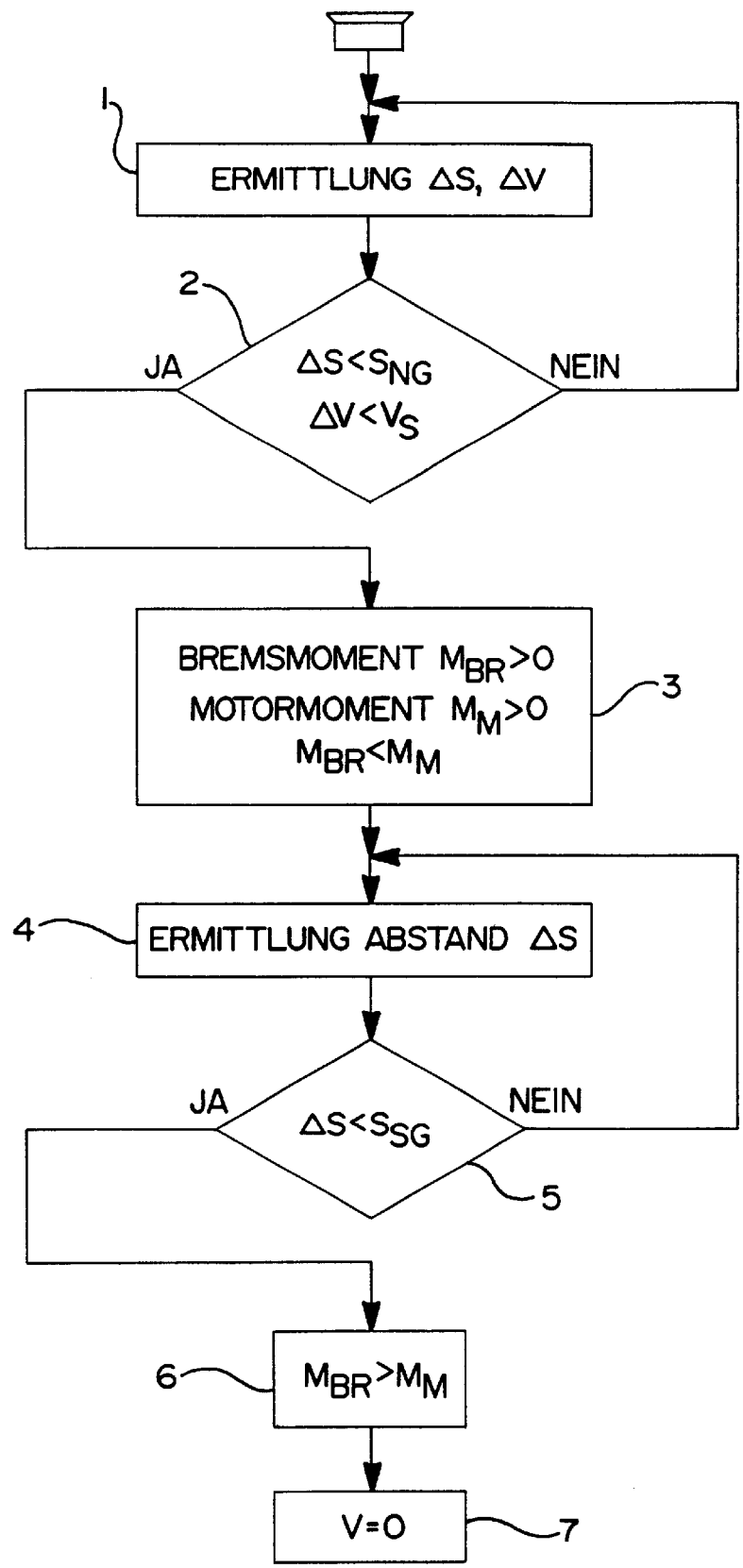

METHOD AND APPLIANCE FOR BRAKING A MOTOR VEHICLE IN THE IMMEDIATE VICINITY OF AN OBSTACLE

The invention relates to a method and an appliance for braking a motor vehicle in the immediate vicinity of an obstacle.

An automatic brake control system for a vehicle, which automatically generates a braking force if the distance and/or relative speed between the vehicle and a preceding vehicle falls below a certain limiting value, is known from the publication DE 43 10 354 A1. For this purpose, the distance apart and the speeds of the two vehicles are determined and compared, in a calculation device, with specified limiting values. If the measured distance apart and/or the relative speed is below the limiting values, braking signals are generated in a control device for controlling the brake system, by means of which signals the vehicle is retarded to such an extent that the distance and/or the relative speed required is restored.

This publication does not however show how, in the immediate vicinity, braking procedures can be optimized at small distances and relative speeds between the vehicle and the obstacle. In driving manoeuvres of this type—for example during parking—the problem exists that, because of the small distance apart (which may only be a few centimetres in certain cases), a rapid driver reaction is required for the change from accelerator to brake pedal in order to avoid collisions with the obstacle. In the case of restricted space relationships, it is often necessary to manoeuvre the vehicle with minimum distance to the obstacle, in which case—despite the usually low speed for these manoeuvres—even a slightly delayed reaction by the driver can lead to damage. In addition, faulty and panic reactions on the part of the driver, for example excessively powerful pedal actuations which cause a vehicle movement not desired by the driver and which can also involve fairly large-scale damage, cannot be excluded.

SUMMARY OF THE INVENTION

The invention is based on the problem of minimizing the reaction time in the case of the slow approach to an obstacle.

In accordance with the novel method, the approach to an obstacle is subdivided into two phases as a function of the distance between vehicle and obstacle. Although, in the first phase, the vehicle is located at a short distance from the obstacle, the distance is still large enough to permit the vehicle to travel at low speed. In this phase, the distance between vehicle and obstacle lies between two specified or calculated limiting values, the proximity limit, where the first phase begins when the distance falls below it, and the stop limit, where the second phase begins when the distance falls below it and in which the vehicle is brought into its final position and the vehicle speed is usually reduced to zero.

In the first phase—after the distance falls below the proximity limit and provided the vehicle speed has also fallen below a specified or calculated threshold value—both the braking torque decelerating the vehicle and the engine torque accelerating it are set to values greater than zero but under the additional condition that the value of the engine torque shall exceed the value of the braking torque. In this phase, the vehicle is acted on by opposing torques; because of the larger engine torque, however, the vehicle remains in motion and the vehicle is prevented from coming to rest before the final position has been reached. At the same time, however, the brake has already been applied.

Because both a braking torque and an engine torque act on the vehicle in the first phase, reaction times of the brake system and the engine to changes in the braking and/or engine torque are limited to a minimum value because there are no delays due to inertia and no transmission time losses. The vehicle reacts more spontaneously and, in addition, the external space relationships present can be exploited in an optimum manner.

Due to further approach of the vehicle to the obstacle, the distance falls below the stop limit and the second phase begins. In the second phase, the qualitative relationship between the braking torque and the engine torque reverses. The braking torque now exceeds the engine torque, with the result that the vehicle speed is reduced and a collision with the obstacle is avoided. The reversal of the relationship between the braking torque and the engine torque can be achieved by either increasing the braking torque or reducing the engine torque, or by a combination of the two. The decision as to whether an intervention in the brake system or an intervention in the engine management system (to adjust the engine drive torque) takes place can be made as a function of parameters and condition variables such as the remaining distance, relative speed, relative deceleration, type and size of the obstacle, type of the driving manoeuvre, specified braking function, etc.

Intervention to produce change in both the wheel brake and engine control systems can take place in the shortest possible time because both components are already acted upon by braking torque and engine torque and there are, therefore, no delays in building up a type of torque. Immediate-vicinity driving manoeuvres in particular, for example parking procedures, which necessitate braking the vehicle at a small distance from obstacles, can therefore be carried out in an optimized manner. It is possible to carry out continuous braking until the vehicle comes to rest, while avoiding deceleration jumps and jolts with, at the same time, the best possible utilization of space. The uniform deceleration helps to avoid undesirable driver reactions. In vehicles with brake-by-wire systems, furthermore, an automatic brake intervention can be undertaken which is not noticed by the driver, it being possible to intensify or moderate the brake pressure generated by the driver via the brake pedal by means of an automatically generated brake pressure.

In expedient developments of the method, the braking torque and the engine torque are adjusted in the first phase, in the distance range between the proximity limit and stop limit, in such a way that the vehicle moves at a constant speed which, particularly during parking, is located in a speed range up to a maximum of approximately 5 km/h.

In a preferred configuration, an obstacle recognition system is employed which can recognize the size and type of an obstacle and, as a function of these parameters, calculate a steering deflection or a steering angle travel in order to avoid the relevant obstacle or to realize an optimum driving function which takes account of the obstacle. The steering deflection or the steering angle travel can either be indicated to the driver optically and/or acoustically or can be undertaken automatically with the aid of servoelements. In the latter case, it can be expedient to intensify or moderate the steering angle intervention carried out by the driver in order to permit the vehicle to follow the optimum, calculated function. During the braking intervention and during the steering angle intervention, it can be advantageous to permit the deviation from the value specified by the driver within specified limits only in order to leave the driver with the final decision on the vehicle behaviour and, in addition, to provide him—for safety reasons—with the feeling that the vehicle reactions are exclusively attributable to him.

In accordance with an advantageous appliance, which is particularly suitable for carrying out the novel method, devices are provided for determining the distance and for determining the relative speed between the vehicle and the obstacle. In addition, the appliance includes a closed-loop and open-chain control device for determining an optimum braking strategy, a brake actuation device for actuation, independent of the driver, of a brake system and, if appropriate, a steering angle sensor including servo-element for adjusting the steering angle.

Appropriate signals, which can be supplied to the closed-loop and open-chain control device as input signals for further processing, are generated in the devices for determining the distance apart and the relative speed. These input signals are compared, in the closed-loop and open-chain control device, with signals which represent the threshold values for the distance and the relative speed. If both input signals are smaller than the associated threshold values, the vehicle approaches the obstacle at a lower speed and is already in the immediate vicinity of the obstacle. Setting signals are then generated in the closed-loop and open-chain control device and these signals influence both the engine torque, by means of the engine management system, and the braking torque, by means of the brake actuation device, both torques being adjusted to a value greater than zero but with the braking torque at a smaller value than the engine torque.

The distance between the vehicle and the obstacle continues to be determined at expedient periodic intervals. If the distance falls below the stop limit, the closed-loop and open-chain control device generates further setting signals which have the effect that the braking torque now exceeds the engine torque, whereupon the vehicle is further braked until, if appropriate, it comes to rest.

The devices for determining distance apart and relative speed involve radar, infrared or laser devices or the like. An image recognition system can be provided as a further device for, in particular, the steering angle specification.

BRIEF DESCRIPTION OF THE DRAWINGS

Further advantages and expedient embodiments are provided by the further claims, the description of the figure and the drawing, in which FIG. 1 sets fourth a flow diagram for the braking of a vehicle in front of an obstacle.

DETAILED DESCRIPTION

In Step 1, the distance As and the relative speed $\Delta v$ between the vehicle and the obstacle are first measured. In a subsequent Step 2, the measured distance $\Delta s$ is compared with a limiting value $S_{NG}$, which represents a proximity limit at which, when the distance falls below it, further measures are initiated. The limiting value $S_{NG}$ can be specified as a fixed quantity or can be calculated for all or for certain situations. As an example, a certain limiting value $S_{NG}$ can be specified for all parking manoeuvres. At the same time, the relative speed $\Delta v$ is compared with a threshold value $v_s$ in Step 2.

The decision as to which manoeuvre will be actually executed can be made on the basis of parameters and condition variables which are determined or input by sensor, calculation or manually by, for example, comparison of the data recorded in image recognition systems with reference data or the like.

In the case where it has been found, during the comparison undertaken in Step 2, that the distance $\Delta s$ does not yet lie below the proximity limit $S_{NG}$ and/or that the relative speed $\Delta v$ has not yet fallen below the threshold value $v_s$, the procedure returns to Step 1 and a fresh distance measurement and a relative speed measurement are carried out at regular periodic intervals.

If the distance $\Delta s$ falls below the proximity limit $S_{NG}$ and, in addition, the relative speed $\Delta v$ falls below the threshold value $v_s$, the sequences shown in Step 3 are initiated.

The distance and relative speed are treated as criteria to be satisfied cumulatively for the initiation of the measures shown in Step 3. If appropriate, however, it can also be expedient to take account of the distance only as the initiation criterion for further steps.

As shown in Step 3, the braking torque $M_{Br}$ exerted by means of the brake system and the engine torque $M_M$, which acts on the vehicle in the direction of travel and which is additively composed of the driving torque generated by the engine and the overrun torque due to the terrain, are matched to one another in such a way that both the braking torque $M_{Br}$ and the engine torque $M_M$ adopt a value greater than zero and the engine torque exceeds the braking torque. Depending on the initial values of the engine torque and the braking torque, both torques can be reduced or increased sufficiently for the above conditions to be satisfied.

Because the engine torque $M_M$ exceeds the braking torque $M_{Br}$, the vehicle moves continuously. The threshold value of the relative speed between the vehicle and the obstacle and the ratio of the braking torque to the engine torque are selected in such a way that, after the vehicle comes within the proximity limit $S_{NG}$, it continues to move with uniform, constant speed, the vehicle speed being expediently set at a small value of, for example, about 5 km/h.

After adjustment of the torques acting on the vehicle, the distance $\Delta s$ between the vehicle and the obstacle is checked again in a next Step 4 and is compared, in a following Step 5, with a further calculated or specified limiting value, the stop limit $S_{SG}$. The stop limit $S_{SG}$ indicates a distance between the vehicle and the obstacle which is smaller than the proximity limit $S_{NG}$. The stop limit designates that distance from which measures are introduced to further reduce the vehicle speed until, if appropriate, the vehicle is brought to rest.

If, during the comparison as shown in Step 5, it is found that the distance $\Delta s$ has not yet fallen below the stop limit $S_{SG}$, the vehicle is located, as before, in the distance range between the proximity limits $S_{NG}$ and $S_{SG}$ and the procedure returns to Step 4 in which further distance measurements are carried out in periodic steps. If the distance $\Delta s$ falls below the stop limit $S_{SG}$, the braking torque $M_{Br}$ and the engine torque $M_M$ are increased, as shown in Step 6, to such an extent that the braking torque $M_{Br}$ exceeds the engine torque $M_M$ and, in consequence, the speed is further reduced. The method ends in Step 7, the vehicle speed v is zero.

Both the matching of the torques to be carried out in the first phase of the method, in accordance with Step 3, and that to be carried out in the second phase of the method, in accordance with Step 6, can take place by increasing and/or reducing the respective torques. The torque matching takes place within specified limits independently, in particular, of the driver's reaction, in order to ensure, in terms of safety and driving convenience, an optimum approach to the obstacle or circumvention of the obstacle.

It is also possible to provide a device for adjusting the steering angle independently of the driver; this is advantageously connected to a system for obstacle recognition. The device for adjusting the steering angle, in combination with the distance recognition system and relative speed recognition system, makes it possible to automatically avoid obstacles which are located in the driving path followed by the driver or determined by the computer.

What is claimed is:

1. Method for braking a motor vehicle at low speeds in order to avoid a collision with an obstacle in its immediate vicinity, the distance ($\Delta s$) and the relative speed ($\Delta v$) between the vehicle and the obstacle being determined by sensor and being based on the calculation of a necessary brake pressure or a deceleration, and the brake pressure being generated at least partially independently of the driver, comprising the steps of:

(1) in the case where the relative speed ($\Delta v$) is less than a threshold value ($v_s$) and the distance ($\Delta s$) is less than a proximity limit ($S_{NG}$), the braking torque ($M_{Br}$) and the engine torque ($M_M$), which is composed of the engine drive torque and the overrun torque, are adjusted in such a way that both the braking torque ($M_{Br}$) and the engine torque ($M_M$) are greater than zero, the braking torque ($M_{Br}$) being smaller than the engine torque ($M_M$); and (2) in the case where the distance ($\Delta s$) is less than a stop limit ($S_{SG}$) which is smaller than the proximity limit ($S_{NG}$), the braking torque ($M_{Br}$) and the engine torque ($M_M$) are adjusted in such a way that the braking torque ($M_{Br}$) exceeds the engine torque ($M_M$).

2. Method according to claim 1, wherein within the distance range between the proximity limit ($S_{NG}$) and the stop limit ($S_{SG}$), the braking torque ($M_{Br}$) and the engine torque ($M_M$) are adjusted in such a way that the vehicle moves at constant speed (v).

3. Method according to claim 2, wherein the vehicle speed (v) is adjusted to a maximum value of about 5 km/h.

4. Method according to claim 1, wherein in the distance range below the stop limit ($S_{SG}$), the braking torque ($M_{Br}$) is increased and/or the engine torque ($M_M$) is reduced.

5. Method according to claim 4, wherein the vehicle is braked until it comes to rest.

6. Method according to claim 1, wherein a system for obstacle recognition is employed and a steering deflection is determined as a function of the obstacle recognized.

7. Method according to claim 6, wherein the steering deflection is undertaken automatically.

8. Method according to claim 6 wherein a radar system is used as the system for obstacle recognition.

9. Method according to claim 6, wherein in that an image processing system is used as the system for obstacle recognition.

10. Method according to claim 6 wherein, characterized in that an infrared sensor is employed as the system for obstacle recognition.

* * * * *